US008867165B2

(12) United States Patent
Isono

(10) Patent No.: US 8,867,165 B2
(45) Date of Patent: Oct. 21, 2014

(54) SPINDLE MOTOR AND DISK DRIVE APPARATUS

(75) Inventor: Masaki Isono, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/562,343

(22) Filed: Jul. 31, 2012

(65) Prior Publication Data

US 2013/0050870 A1 Feb. 28, 2013

(30) Foreign Application Priority Data

Aug. 23, 2011 (JP) .................................. 2011-181418

(51) Int. Cl.
*G11B 17/02* (2006.01)
*G11B 17/03* (2006.01)

(52) U.S. Cl.
USPC ...................... 360/99.08; 720/695; 310/49.22

(58) Field of Classification Search
USPC ......... 360/98.07, 99.04, 99.08; 720/695–699;
310/216.111, 216.112, 49.22, 49.23,
310/49.25, 49.26, 49.27, 49.29, 49.31, 193,
310/216.055, 216.068–216.073
See application file for complete search history.

(56) References Cited

U.S. PATENT DOCUMENTS

| 2006/0082247 A1* | 4/2006 | Tamaoka et al. ............... 310/261 |
| 2006/0197402 A1* | 9/2006 | Gomyo et al. ................. 310/216 |
| 2006/0221495 A1* | 10/2006 | Tamaoka et al. ........... 360/99.08 |
| 2008/0061646 A1* | 3/2008 | Kodama et al. ................. 310/90 |

FOREIGN PATENT DOCUMENTS

| JP | 2006-230095 A | | 8/2006 |
| JP | 2006230095 A | * | 8/2006 |
| JP | 2008-187844 A | | 8/2008 |

OTHER PUBLICATIONS

Tamaoka, "Spindle Motor and Disk Drive Apparatus," U.S. Appl. No. 13/562,344, filed Jul. 31, 2012.

* cited by examiner

*Primary Examiner* — Adam B Dravininkas
(74) *Attorney, Agent, or Firm* — Keating & Bennett, LLP

(57) ABSTRACT

A spindle motor includes a stationary portion defined by a base portion, a stator core arranged on the side of an upper surface of the base portion, and a coil attached to the stator core. A rotating portion includes a magnet arranged on a radially inner side of the stator core, a first supporting surface which is in contact with a lower surface of a disk, and a disk supporting portion arranged on a radially outer side than the magnet. The stator core includes a ring-shaped core back, and a plurality of teeth. The disk supporting portion is positioned radially outward from a radially inner end portion of the teeth and radially inward from the coil. The radially inner end portion of the teeth, the disk supporting portion, and the coil overlap in the radial direction.

15 Claims, 10 Drawing Sheets

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

A hard disk device is provided with a spindle motor for rotating a disk. Conventional spindle motors are, for example, described in Japanese Laid-Open Patent Publication No. 2006-230095 and Japanese Laid-Open Patent Publication No. 2008-187844. The spindle motors described in these patent publications are both so-called inner rotor type spindle motors. In the inner rotor type spindle motor, a magnet is rotated on the inside of a coil. Especially, the inner rotor type spindle motor is often used in a hard disk device which is desired to be thinner.

In the spindle motor disclosed in Japanese Laid-Open Patent Publication No. 2006-230095, the axial position of a stator is lowered by bending teeth of the stator (see paragraph [0026] of Japanese Laid-Open Patent Publication No. 2006-230095). In addition, the position of the stator is axially lowered by providing an opening hole in a position corresponding to the stator in a motor base (see paragraph [0027] of Japanese Laid-Open Patent Publication No. 2006-230095). According to Japanese Laid-Open Patent Publication No. 2006-230095, with the above-described configuration, the spindle motor can be thinner. In Japanese Patent Publication No. 2008-187844, a stator core having an inclined portion is used (see paragraph [0017] and FIG. 2 of Japanese Patent Publication No. 2008-187844).

However, in the configuration disclosed in Japanese Laid-Open Patent Publication No. 2006-230095, a projection is provided in an outer circumferential portion of a rotor hub. A lower surface of the projection is positioned at a higher level than an upper surface of wirings of the stator (see paragraph [0043] and FIG. 2 of Japanese Laid-Open Patent Publication No. 2006-230095). In the configuration disclosed in Japanese Laid-Open Patent Publication No. 2008-187844, a rim axially protrudes, and the rim is provided in an outermost circumferential portion of a rotor hub, a lower end portion of the rim is located above an upper surface of the stator core and the stator coil (see paragraph [0020], and FIG. 2 of Japanese Laid-Open Patent Publication No. 2008-187844).

In these configurations, the thickness in an axial direction of a coil and the thickness in the axial direction of the outer circumferential portion of the rotor hub are simply added in dimensioning of the spindle motor. For this reason, in the configurations, it is difficult to further reduce the thickness of the spindle motor. On the other hand, recently, requirements for an extremely thin computer such as a tablet PC are increased. Therefore, the size in the axial direction of the spindle motor is required to be further reduced.

SUMMARY OF THE INVENTION

In accordance with preferred embodiments of the present invention, a spindle motor includes a stationary portion and a rotating portion. The rotating portion is supported rotatably with respect to the stationary portion. The rotating portion centers on a center axis extending vertically. The stationary portion preferably includes a base portion, a stator core, and a coil. The base portion extends in a direction orthogonal or substantially orthogonal to the center axis extending vertically. The stator core is arranged on the side of an upper surface of the base portion. The coil is attached to the stator core. The rotating portion preferably includes a magnet and a disk supporting portion. The magnet is arranged on a radially inner side of the stator core. The disk supporting portion has a first supporting surface which is in contact with a lower surface of a disk. The disk supporting portion is arranged on a radially outer side than the magnet. The stator core preferably includes a ring-shaped core back and a plurality of teeth. The plurality of teeth protrudes from the core back toward a radially inner side. The disk supporting portion is positioned on a radially outer side outside of a radially inner end portion of the teeth, and positioned on a radially inner side inside of the coil. The radially inner end portion of the teeth, the disk supporting portion, and the coil overlap in a radial direction.

A disk drive apparatus includes the above-described spindle motor, an access unit, and a cover. The access unit performs at least one of reading and writing of information from and to a disk supported by the rotating portion of the spindle motor. A housing is preferably defined by the base portion and the cover. The rotating portion and the access unit are accommodated in the interior of the housing.

In one preferred embodiment of the present invention, at least a portion of the disk supporting portion is located between the radially inner end portion of the teeth and the coil. Accordingly, the height of the first supporting surface with respect to the stator core is significantly reduced. As a result, the axial dimension of the spindle motor is significantly reduced. In addition, the disk drive apparatus includes the above-described spindle motor, so that the thickness of the disk drive apparatus can be significantly reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Referring to the attached drawings, preferred embodiments of the present invention will be described in detail. Meanwhile, in the following description, a direction along the center axis indicates a vertical direction, i.e., up/down directions and the side of the coil with respect to the base portion is the upper side. The definition of the up/down directions is only for convenience of explanation, and the positional relationships and orientations in the use of the spindle motor and the disk driving device according to preferred embodiments of the present invention are not limited by the definition.

Figure 1:
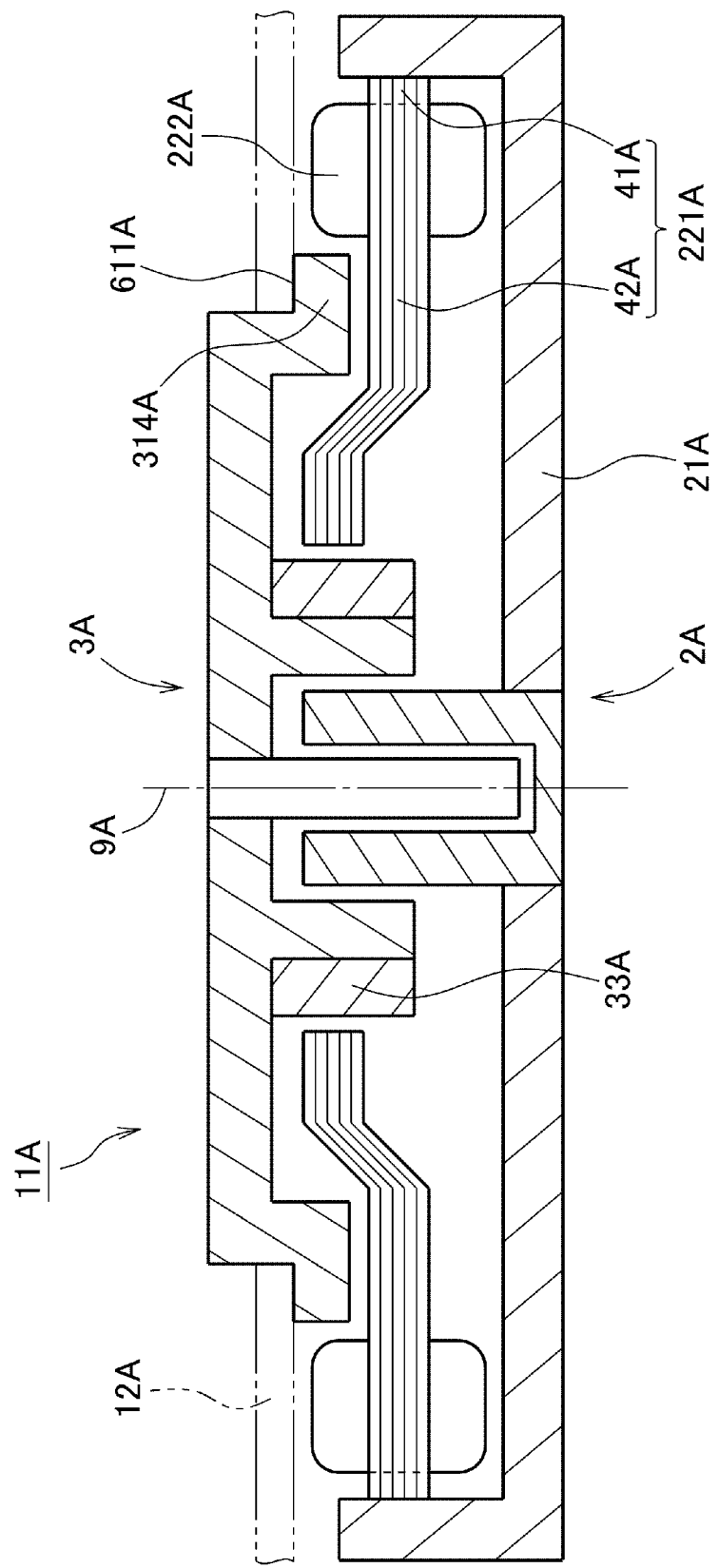
FIG. 1 is a longitudinal sectional view of a spindle motor according to a preferred embodiment of the present invention.

FIG. 1 is a longitudinal sectional view of a spindle motor 11A in one preferred embodiment of the present invention. As shown in FIG. 1, the spindle motor 11A includes a stationary portion 2A and a rotating portion 3A. The rotating portion 3A is rotatably supported with respect to the stationary portion 2A.

The stationary portion 2A preferably includes a base portion 21A, a stator core 221A, and a coil 222A. The base portion 21A extends out in a direction orthogonal or substantially orthogonal to a center axis 9A. The stator core 221A is located on the top side of the base portion 21A. The stator core 221A preferably has a ring-shaped core back 41A and teeth 42A. The teeth 42A protrude radially inwards from the core back 41A. The coil 222A is attached to the stator core 221A.

The rotating portion 3A rotates around the center axis 9A. The rotating portion 3A preferably includes a magnet 33A and a disk supporting portion 314A. The magnet 33A is preferably located on a radially inner side of the stator core 221A. The disk supporting portion 314A is located on a radially outer side than the magnet 33A. The disk supporting portion 314A preferably includes a first supporting surface 611A. The first supporting surface 611A is preferably in contact with a lower surface of a disk 12A.

As shown in FIG. 1, the disk supporting portion 314A is preferably positioned on a radially outer side that is positioned further in the radial direction than a radially inner end portion of the teeth 42A, and that is also positioned radially inward from the coil 222A. In addition, radially inner end portions of the teeth 42A, the disk supporting portion 314A, and the coil 222A all preferably mutually overlap in the radial direction. Accordingly, at least a portion of the disk supporting portion 314A is located between the radially inner end portion of the teeth 42A and the coil 222A, so that the height of the first supporting surface 611A with respect to the stator core 221A is significantly reduced. As a result, the axial dimension of the spindle motor 11A can be made as small as possible.

Next, more specific preferred embodiments of the present invention will be described.

Figure 2:
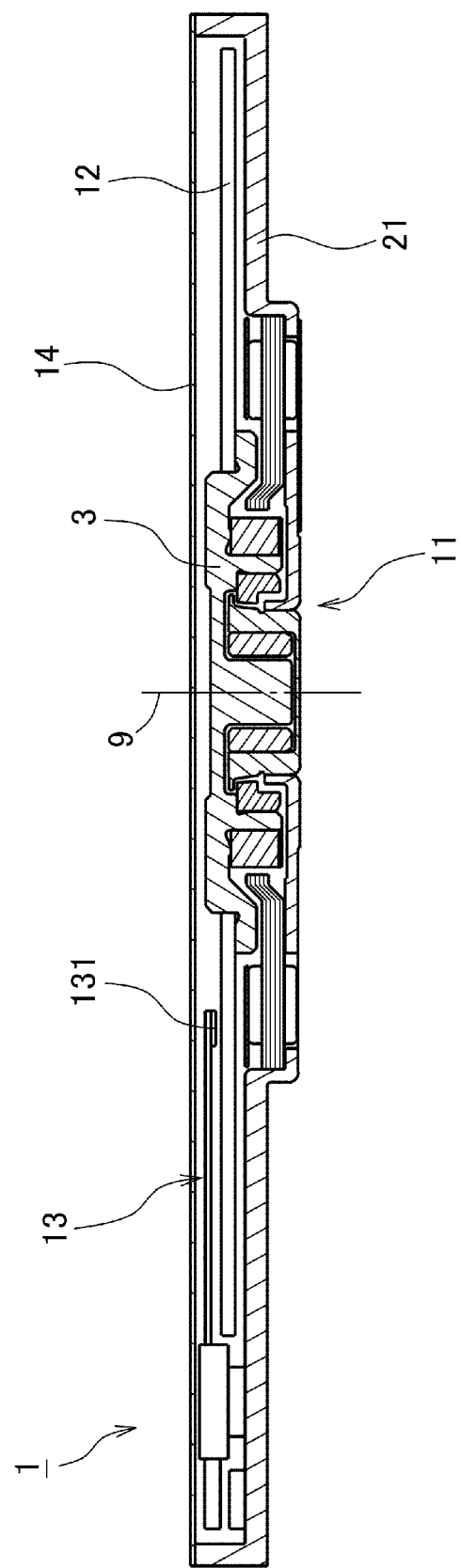
FIG. 2 is a longitudinal sectional view of a disk driving device according to a preferred embodiment of the present invention.

FIG. 2 is a longitudinal sectional view of a disk driving device 1 according to a preferred embodiment of the present invention. The disk driving device 1 is a device arranged to rotate a magnetic disk 12 and to perform at least one of "reading" and "writing" of information from and into the magnetic disk 12. As shown in FIG. 2, the disk driving device 1 preferably includes a spindle motor 11, a magnetic disk 12, an access unit 13, and a cover 14.

The spindle motor 11 holds the magnetic disk 12 and rotates the magnetic disk 12 around the center axis 9. The spindle motor 11 preferably includes a base portion 21 extending along the lower surface of the magnetic disk 12. A housing preferably includes the base portion 21 and the cover 14. The rotating portion 3, the magnetic disk 12, and the access unit 13 of the spindle motor 11 are accommodated in the interior of the housing.

The access unit 13 moves a head 131 along a recording surface of the magnetic disk 12. By using the head 131, the access unit 13 performs "the reading" and "the writing" of information to and from the magnetic disk 12. The access unit 13 may include two or more heads 131. Alternatively, the access unit 13 may perform only either one of "the reading" or "the writing" of information to or from the magnetic disk 12.

Figure 3:
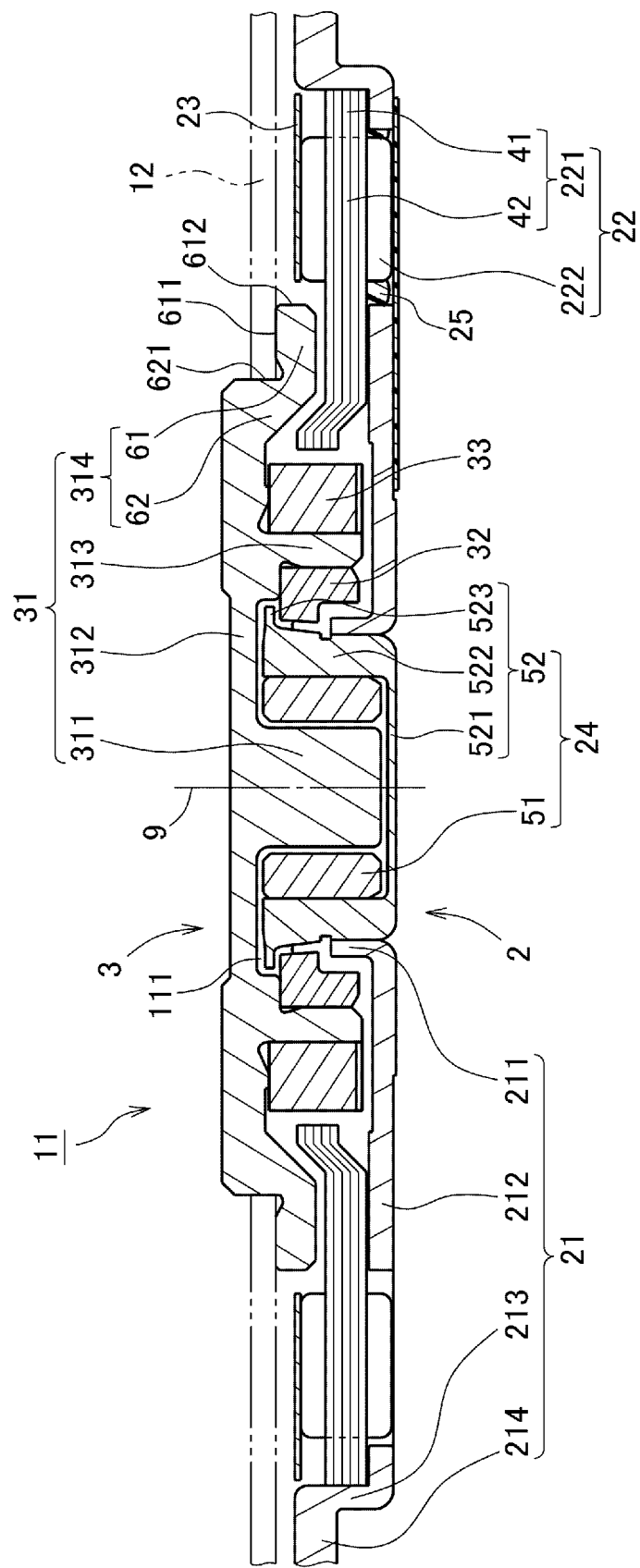
FIG. 3 is a longitudinal sectional view of a spindle motor according to a preferred embodiment of the present invention.

Next, the configuration of the spindle motor 11 of a preferred embodiment of the present invention will be described. FIG. 3 is a longitudinal sectional view of the spindle motor 11. As shown in FIG. 3, the spindle motor 11 includes a stationary portion 2 and a rotating portion 3. The stationary portion 2 is preferably fixed or substantially fixed with respect to the base portion 21 and the cover 14. The rotating portion 3 is preferably rotatably supported with respect to the stationary portion 2.

The stationary portion 2 in the present preferred embodiment preferably includes a base portion 21, a stator unit 22, a magnetic shielding plate 23, and a stationary bearing unit 24.

The base portion 21 supports the stator unit 22 and the stationary bearing unit 24. The base portion 21 is preferably formed, for example, by press-processing a plate of a magnetic material (for example, a galvanized steel plate, or the like). As shown in FIG. 3, the base portion 21 preferably includes an inner cylindrical portion 211, inner flat-plate portion 212, an outer cylindrical portion 213, and an outer flat-plate portion 214.

The inner cylindrical portion 211 is arranged coaxially or substantially coaxially with the center axis 9. The inner flat-plate portion 212 extends outwards in a radial direction from a lower end portion of the inner cylindrical portion 211. Herein the radial direction is a direction orthogonal to the center axis or a direction substantially orthogonal to the center axis. This definition will be used in the same way in the following description. The outer cylindrical portion 213 extends upwards from an outer circumferential portion of the inner flat-plate portion 212. The outer flat-plate portion 214 extends further outwards in the radial direction from an upper end portion of the outer cylindrical portion 213.

The stator unit 22 preferably has a stator core 221 and a plurality of coils 222. The stator core 221 is preferably located on an upper side of the inner flat-plate portion 212 and on the radially inside of the outer cylindrical portion 213. The stator core 221 is preferably defined by a laminated steel structure which is provided by laminating a plurality of magnetic steel plates in the axial direction, for example. Alternatively, any other desirable method for providing a stator could be used instead. The axial direction is a direction parallel to the center axis or a direction substantially parallel to the center axis. The definition will be used in the same way in the following description. As the magnetic steel plates, for example, a silicon steel plate or the like may be used. The stator core 221 preferably includes a ring-shaped core back 41, and a plurality of teeth 42 protruding radially inwards from the core back 41.

The core back 41 is preferably, for example, press fitted into an inner circumference of the outer cylindrical portion 213 of the base portion 21. Alternatively, the core back 41 is, for example, bonded to the inner circumference of the outer cylindrical portion 213 of the base portion 21 via a gap. The plurality of teeth 42 are preferably arranged at equal or substantially equal intervals in a circumferential direction. The core back 41 and the coils 222 are preferably located on a radially outer side that is arranged further in the radial direction than an outer circumference 612 of a hub 31 which will be described later. On the other hand, a radially inner end portion of the teeth 42 is preferably positioned radially inward from the outer circumference 612 of the hub 31.

The coils 222 are attached in the vicinity of a radially outer end portion of the teeth 42. An end portion of a conducting wire defining the coil 222 is preferably connected to a power supplying device via, for example, a circuit board (not shown).

The magnetic shielding plate 23 is preferably a ring-shaped member, and is made of a magnetic material. The magnetic shielding plate 23 is preferably located between an upper end portion of the coil 222 and a lower surface of the magnetic disk 12. In this preferred embodiment, magnetic interaction between the coil 22 and the magnetic disk 12 is reduced by the provision of the magnetic shielding plate 23. With such a configuration, the distance between the coil 222 and the magnetic disk 12 in the axial direction is shortened.

The stationary bearing unit 24 is a mechanism arranged to rotatably support the hub 31 on the side of the rotating portion 3. The stationary bearing unit 24 preferably includes a substantially cylindrical sleeve 51 and a sleeve housing 52. The sleeve housing 52 has a substantially cylindrical shape with a bottom and holds the sleeve 51. The sleeve 51 surrounds an outer circumference of a shaft portion 311 which will be described later. Lubricating oil 111 is interposed between the hub 31 which will be described later and the sleeve 51 and the sleeve housing 52.

The sleeve housing 52 preferably includes a bottom portion 521, a cylindrical portion 522, and a flange portion 523. An upper surface of the bottom portion 521 axially faces a lower end portion of the shaft portion 311. The cylindrical portion 522 extends upwards from an outer circumferential portion of the bottom portion 521. The cylindrical portion 522 is preferably, for example, press fitted into an inner circumference of the inner cylindrical portion 211 of the base portion 21, or bonded thereto via a gap. The flange portion 523 preferably protrudes radially outwards from an upper end portion of the cylindrical portion 522.

The rotating portion 3 in the present preferred embodiment preferably includes the hub 31, a retaining member 32, and a magnet 33.

The hub 31 rotates around the center axis 9 while being supported by the stationary bearing unit 24. The hub 31 is preferably made, for example, by a ferromagnetic material such as ferritic stainless steel. The hub 31 preferably includes a shaft portion 311, a top plate portion 312, an annular holding portion 313, and a disk supporting portion 314. The shaft portion 311 extends in a substantially cylindrical manner along the center axis 9. The shaft portion 311 is inserted into the inside of the sleeve 51. The top plate portion 312 extends towards the radially outer side from an upper end portion of the shaft portion 311. The annular holding portion 313 extends downwards in a substantially cylindrical manner from a lower surface of the top plate portion 312.

The disk supporting portion 314 is preferably located radially outward from the magnet 33. The disk supporting portion 314 preferably includes an annular surface portion 61 and an annular wall portion 62. The annular wall portion 62 extends downwards from an outer circumferential portion of the top plate portion 312. The annular surface portion 61 protrudes radially outwards from a lower end portion of the annular wall portion 62. A top surface of the annular surface portion 61 preferably includes a first supporting surface 611 which is in contact with a lower surface of the magnetic disk 12. The position of the magnetic disk 12 in the axial direction is determined by the first supporting surface 611. An outer circumference of the annular wall portion 62 includes a second supporting surface 621 which is contact with an inner circumferential portion of the magnetic disk 12. The position of the magnetic disk 12 in the radial direction is determined by the second supporting surface 621.

The retaining member 32 is preferably a ring-shaped member. The retaining member 32 is arranged radially inward from the annular holding portion 313, on the lower side of the top plate portion 312, and radially outward from the stationary bearing unit 24. The retaining member 32 is preferably fixed to the inner circumference of the annular holding portion 313 by an adhesive, for example. An inner circumferential portion of the retaining member 32 is preferably positioned under the flange portion 523 of the sleeve housing 52. If the rotating portion 3 moves upwards, the lower surface of the flange portion 523 comes into contact with the upper surface of the inner circumferential portion of the retaining member 32. Accordingly, the upward movement of the rotating portion 3 is restricted.

The magnet 33 is preferably a ring-shaped member. The magnet 33 is preferably located radially outward from the annular holding portion 313, on the lower side of the top plate portion 312, and radially inward from the stator core 221. The magnet 33 is preferably fixed to the outer circumference of the annular holding portion 313 by an adhesive, for example. The outer circumference of the magnet 33 is preferably radially opposite to radially inner end surfaces of the plurality of teeth 42, respectively. An N pole and an S pole are alternately magnetized in a circumferential direction on the outer circumference of the magnet 33.

In the spindle motor 11 with the above-described configuration, when a driving current is applied to the coil 222, a magnetic flux is radially generated in the plurality of teeth 42 of the stator core 221. Due to the action of the magnetic flux between the teeth 42 and the magnet 33, a torque is generated in the circumferential direction. As a result of the torque, the rotating portion 3 rotates around the center axis 9 with respect to the stationary portion 2. The magnetic disk 12 held by the hub 31 also rotates together with the rotating portion 3 around the center axis 9.

Figure 4:
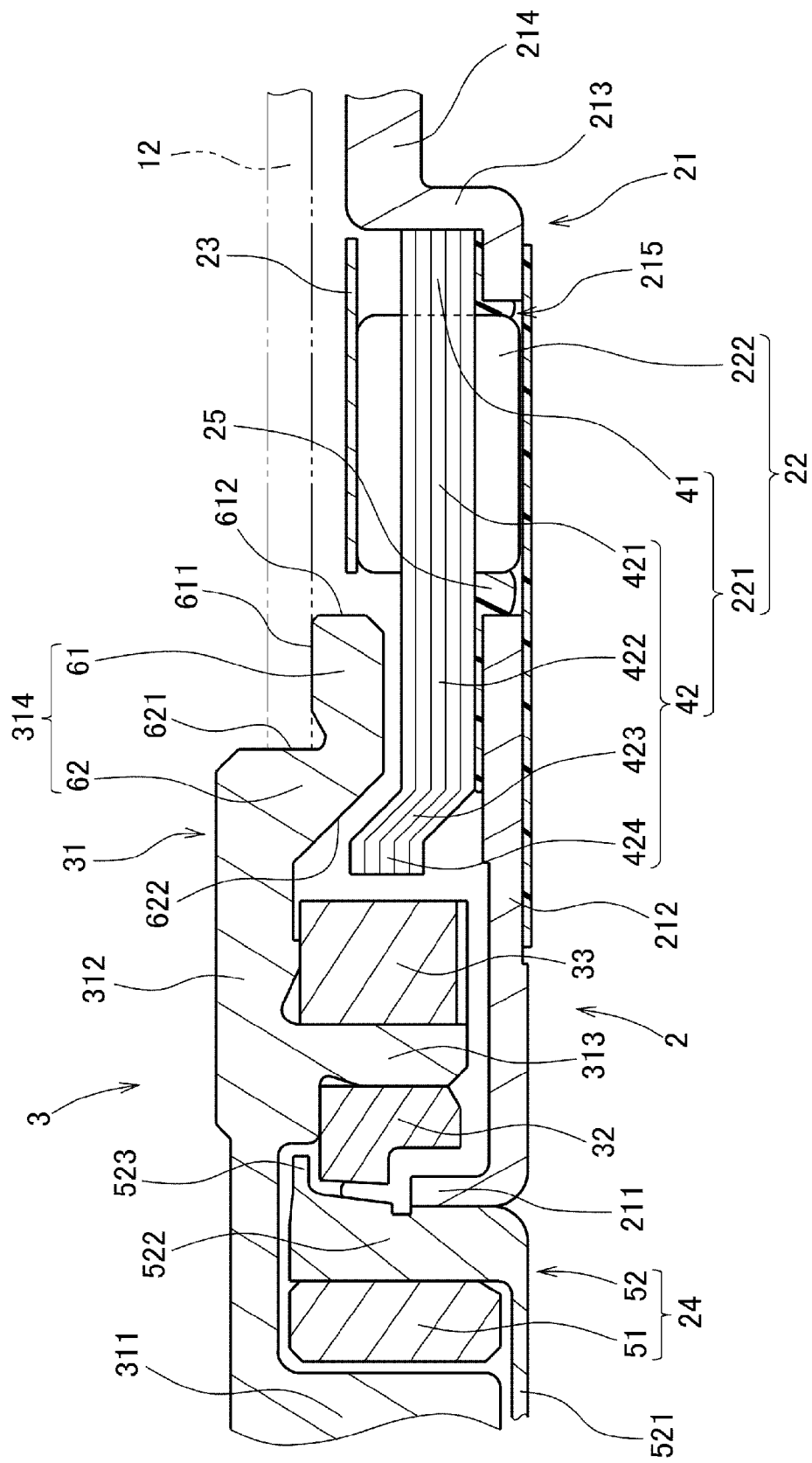
FIG. 4 is a partial longitudinal sectional view of the spindle motor according to a preferred embodiment of the present invention.

Next, a more detailed configuration of the teeth 42 and in the vicinity of the teeth 42 will be described. FIG. 4 is a partial longitudinal sectional view of the spindle motor 11 of the present preferred embodiment. As shown in FIG. 4, each of the teeth 42 in the present preferred embodiment preferably includes an outer core portion 421, a middle core portion 422, and an inclined core portion 423, and an end core portion 424.

The outer core portion 421 is preferably radially continuous with the middle core portion 422 in the same axial position. The outer core portion 421 is positioned radially outward from the outer circumference 612 of the hub 31. A conducting wire which defines the coil 222 is preferably wound around the outer core portion 421. The middle core portion 422 is positioned radially inward from the outer core portion 421 and the coil 222. The middle core portion 222 extends radially between the upper surface of the inner flat-plate portion 212 of the base portion 21 and the lower surface of the disk supporting portion 314 of the hub 31.

The inclined core portion 423 obliquely extends radially inwards and upwards from the inner circumferential portion of the middle core portion 422. The end core portion 424 extends radially inwards from the inner circumferential portion of the inclined core portion 423. Accordingly, at least the top end portion of the end core portion 424 is located above the outer core portion 421 and the middle core portion 422. A radially inner end surface of the end core portion 424 is radially opposite to the outer circumference of the magnet 33. The whole of the end core portion 424 may alternatively be located above the outer core portion 421 and the middle core portion 422.

As shown in FIG. 4, the disk supporting potion 314 is positioned radially outward from the end core portion 424 of the teeth 42 and positioned radially inward from the coil 222. In addition, the end core portion 424, the annular surface portion 61, and the coil 222 radially overlap. Specifically, at least a portion of the end core portion 424, at least a portion of the annular surface portion 61, and at least portion of the coil 222 are preferably positioned at the same height, respectively.

Accordingly, the height position of the first supporting surface 611 with respect to the stator core 221 can be significantly reduced as compared with the case where the annular rest portion is located above the coil or the end core portion. Accordingly, the height position of the first supporting surface 611 with respect to the base portion 21 is also significantly reduced. As a result, the axial dimension of the spindle motor 11 can be significantly reduced.

Especially, in the present preferred embodiment, the height position of the upper end portion of the coil 222 is higher than the lower surface of the annular surface portion 61 and lower than the first supporting surface 611. Accordingly, the magnetic disk 12 will preferably not come into contact with the coil 222.

In the present preferred embodiment, the inner flat-plate portion 212 of the base portion 21 includes a through hole 215. In addition, a lower portion of the coil 222 is accommodated in the interior of the through hole 215. Therefore, the lower end portion of the coil 222 is preferably positioned below the upper surface of the inner flat plate portion 212. In this way, the height position of the stator core 221 and the coil 222 with respect to the base portion 21 is significantly reduced. As a result, the axial dimension of the spindle motor 11 can be even more significantly reduced.

The end core portion 424 of the teeth 42 is located above the outer core portion 421 and the middle core portion 422. Specifically, the upper end portion of the radially inner end surface of the end core portion 424 is located at a higher position than the lower surface of the annular surface portion 61, and at a lower position than the first supporting surface 611. With such a configuration, the height position of the end core portion 424 is closer to the height position of the axial center of the magnet 33. Accordingly, a torque is efficiently generated between the end core portion 424 and the magnet 33.

In addition, in the present preferred embodiment, the inclined core portion 423 is positioned radially inward from the second supporting surface 621 of the disk supporting portion 314. With such an arrangement, it is difficult for the annular surface portion 61 to restrict the axial position of the inclined core portion 423. Similarly, it is difficult for the inclined core portion 423 to restrict the axial position of the annular surface portion 61. Accordingly, the height of the annular surface portion 61 with respect to the stator core 221 can be even more significantly reduced. As a result, the axial dimension of the spindle motor 11 is even more significantly reduced.

It is preferable to provide a gap in the axial direction between the lower surface of the annular wall portion 62 of the disk supporting portion 314 and the upper surface of the inclined core portion 423. On the other hand, in order to increase the rigidity of the disk supporting portion 314, it is preferred that the thickness in the axial direction of the annular wall portion 62 be increased. In the present preferred embodiment, in order to satisfy both of these preferred features, the lower surface of the annular wall portion 62 functions as an inclined lower surface 622 extending along the upper surface of the inclined core portion 423. Accordingly, a minimum gap can be ensured between the inclined core portion 423 and the annular wall portion 62, and the thickness in the axial direction of the disk supporting portion 314 can preferably be ensured.

In order to realize a thinner spindle motor 11, it is preferred that an axial gap between the upper surface of the middle core portion 422 and the lower surface of the annular surface portion 61 be at a minimum. For example, the axial gap between the upper surface of the middle core portion 422 and the lower surface of the annular surface portion 61 is preferably smaller than the radial gap between the radially inner end surface of the end core portion 424 and the outer circumference of the magnet 33.

In addition, in the present preferred embodiment, the entire magnetic shielding plate 23 is preferably located radially outward from the outer circumference 612 of the hub 31. Moreover, the upper surface of the magnetic shielding plate 23 is preferably positioned below the first supporting surface 611. The end core portion 424 and the annular surface portion 61 preferably radially overlap not only the coil 222 but also the magnetic shielding plate 23. Accordingly, an increase of the axial dimension caused by the magnetic shielding plate 23 can be prevented.

In the present preferred embodiment, the upper end portion of the magnet 33 is positioned above the first supporting surface 611. With such a configuration, the height of the first supporting surface 611 with respect to the base portion 21 can be significantly reduced, and the axial dimension of the magnet 33 can be increased. If the axial dimension of the magnet 33 can be increased, the magnetic force of the magnet 33 is increased and the torque of the spindle motor 11 is enhanced.

In general, in the case of the configuration in which the teeth extend radially inwards like a thin plate from the core back, the teeth 42 may disadvantageously vibrate vertically. On the other hand, in the present preferred embodiment, an adhesive 25 is preferably provided between the upper surface of the inner flat plate portion 212 and the lower surface of the middle core portion 422. With such an arrangement, the vibration of the teeth 42 can be significantly reduced as compared with the case where the adhesive is not provided.

In the present preferred embodiment, the annular holding portion 313 preferably holds the retaining member 32 and the magnet 33. With such a configuration, the rigidity of the annular holding portion 313 is enhanced as compared with the case where any other portion of the hub 31 holds the magnet 33. Accordingly, the strength against the external force (vibrations, shocks, or the like) is further increased.

Figure 5:
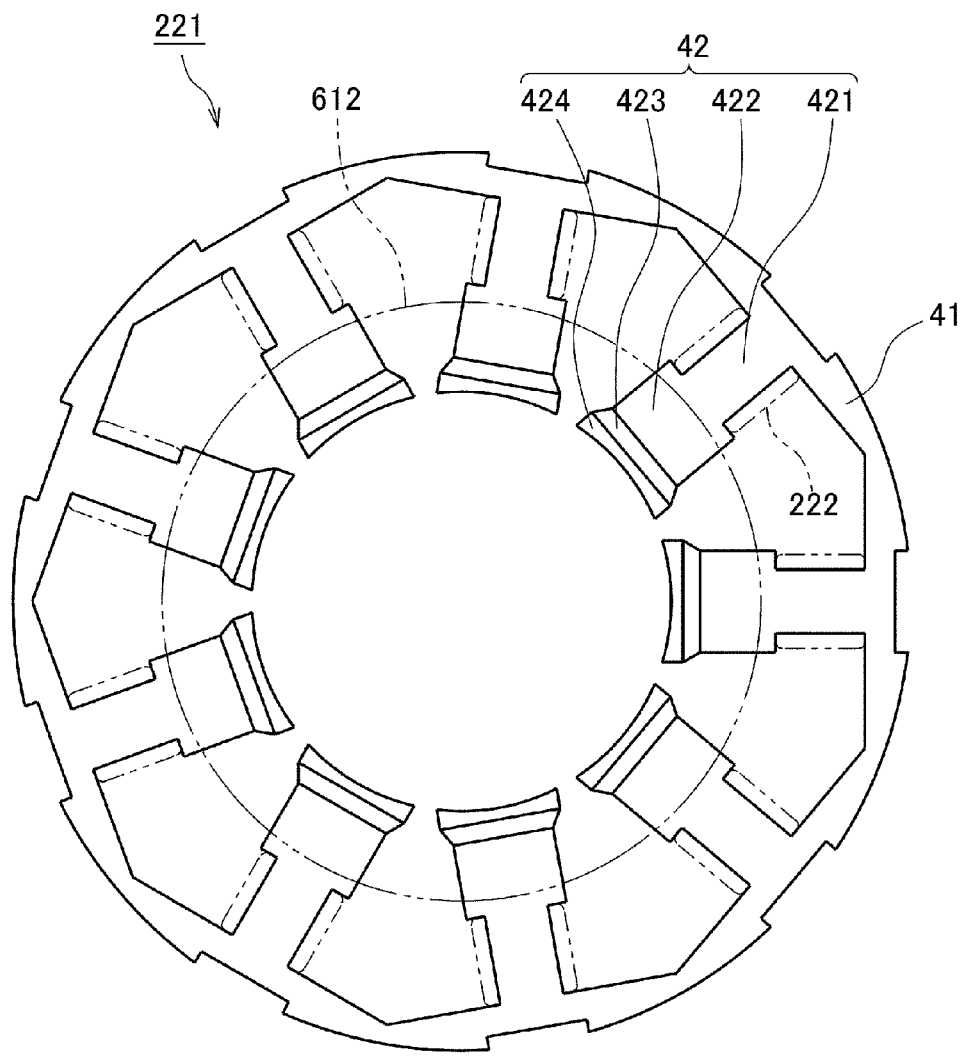
FIG. 5 is a top view of a stator core according to a preferred embodiment of the present invention.
Figure 6:
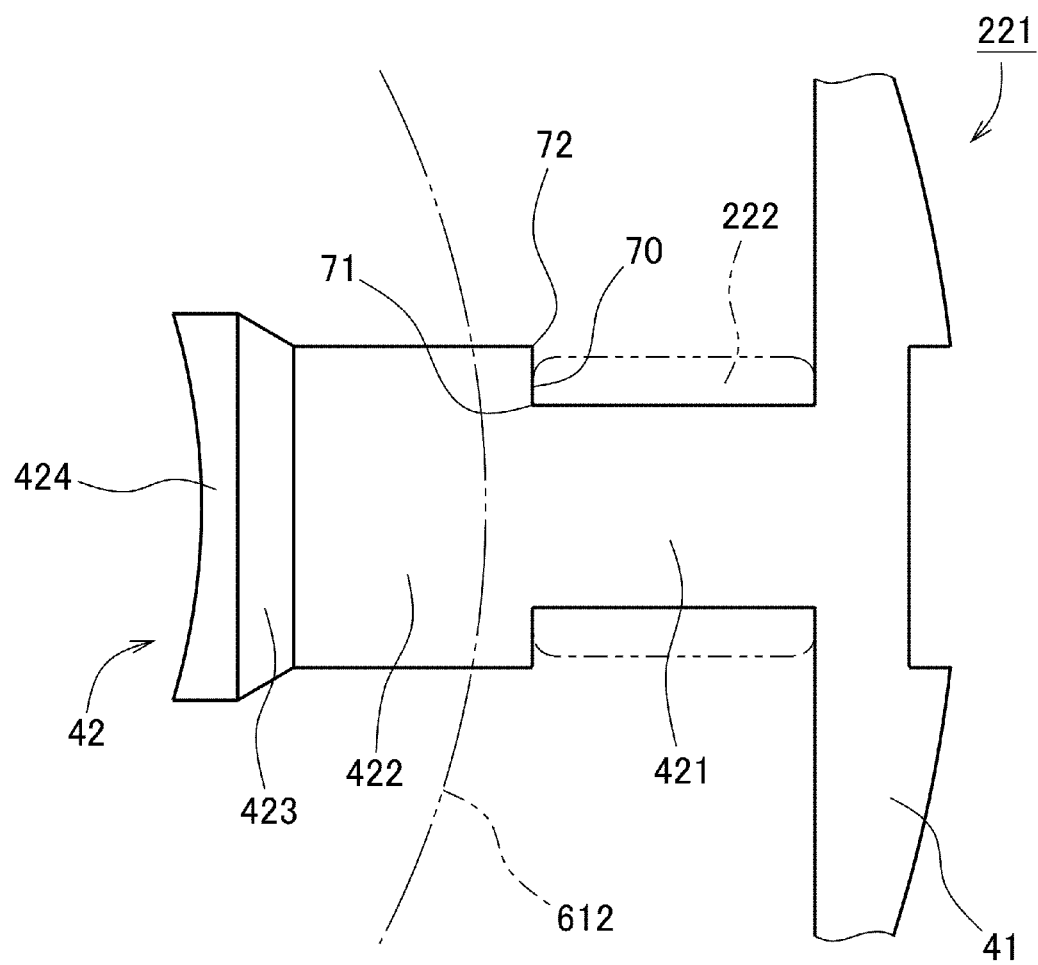
FIG. 6 is a partial top view of the stator core according to a preferred embodiment of the present invention.

FIG. 5 is a top view of the stator core 221. FIG. 6 is a partial top view of the stator core 221 and shows the vicinity of one of the teeth 42. In FIG. 5 and FIG. 6, the coil 222 and the outer circumference 612 of the hub 31 are depicted by two-dot chain lines. As shown in FIG. 5 and FIG. 6, the circumferential width of the outer core portion 421 of the teeth 42 is preferably smaller than the circumferential widths of the middle core portion 422, the inclined core portion 423, and the end core portion 424. A stepped surface 70 is preferably located between the outer core portion 421 and the middle core portion 422. The stepped surface 70 varies the circumferential width of the teeth 42.

The stepped surface 70 is preferably positioned radially outward from the outer circumference 612 of the hub 31, and positioned radially inward from the coil 222. The stepped surface 70 is opposite to the coil 222 via a gap or in contact with the coil 222 in the radial direction. In the present preferred embodiment, the stepped surface 70 preferably prevents the collapse of the coil 222 on the radially inner side. If the collapse of the coil 222 on the radially inner side is prevented by the stepped surface 70, the conducting wire which defines the coil 222 is preferably prevented from being in contact with the outer circumference 612 of the hub 31. Accordingly, it is possible to locate the coil 222 on the radially outer side of the hub 31. As a result, the axial dimension of the spindle motor 11 can be significantly reduced.

The stepped surface 70 preferably extends in the circumferential direction from the side surface of the teeth 42. That is, the stepped surface 70 is provided without increasing the axial dimension of the teeth 42. Especially, the stator core 221 in the present preferred embodiment is preferably provided by a laminated steel member defined by laminating a plurality of laminated steel plates in the axial direction. Alternatively, any other desirable type of stator core could be used instead. For this reason, the stepped surface 70 extending in the circumferential direction can be easily provided.

In the present preferred embodiment, the middle core portion 422, the inclined core portion 423, and the end core portion 424 define an inner core portion. The inner core portion is preferably positioned radially inward from the outer core portion 421. The stepped surface 70 is preferably provided in a radially outer end portion of the inner core portion. In other words, the inner core portion preferably includes a positioning portion including the stepped surface 70 on the radially outer side than the outer circumference of the hub 31 and on the radially inner side than the coil 222. The position of the conducting wire is determined by the positioning portion.

The stepped surface 70 preferably extends in the circumferential direction between a base end portion 71 on the circumferentially inner side of the teeth 42 and a side end portion 72 on the circumferentially outer side of the teeth 42. In the present preferred embodiment, the base end portion 71 is located in the same radial position as the side end portion 72. As shown in FIG. 6, the width of the stepped surface 70 in the circumferential direction is preferably larger than the width of the coil 222 in the circumferential direction. With such a configuration, the contact of the conducting wire which defines the coil 222 with the outer circumference 612 of the hub 31 can be even more significantly reduced.

In the present preferred embodiment, the widths of the middle core portion 422, the inclined core portion 423, and the end core portion 424 in the circumferential direction are preferably larger than the width of the outer core portion 421 in the circumferential direction, respectively. Accordingly, it is difficult for the magnetic flux generated in the outer core portion 421 to cause a magnetic saturation in the middle core portion 422, the inclined core portion 423, and the end core portion 424, respectively. Therefore, a magnetic flux is efficiently generated in a radially inner end portion of each of the teeth 42.

In the present preferred embodiment, the width of the end core portion 424 in the circumferential direction is preferably larger than the width of the middle core portion 422 in the circumferential direction. With such a configuration, the circumferential interval between mutually adjacent end core portions 424 can be decreased. Thus, in the vicinity of the end portion of each of the teeth 42 on the radially inner side, the switching of magnetic flux in the circumferential direction is gentle, and the cogging torque can be significantly reduced and prevented.

As shown in FIG. 4, in the present preferred embodiment, the lower portion of the coil 222 is preferably fixed by an adhesive 25, for example. In this way, when at least a portion of the coil 222 is fixed by the adhesive, the collapse of the coil 222 can be further prevented.

The exemplarily preferred embodiments of the present invention have been explained above, but the present invention is not limited to the above-described preferred embodiments.

Figure 7:
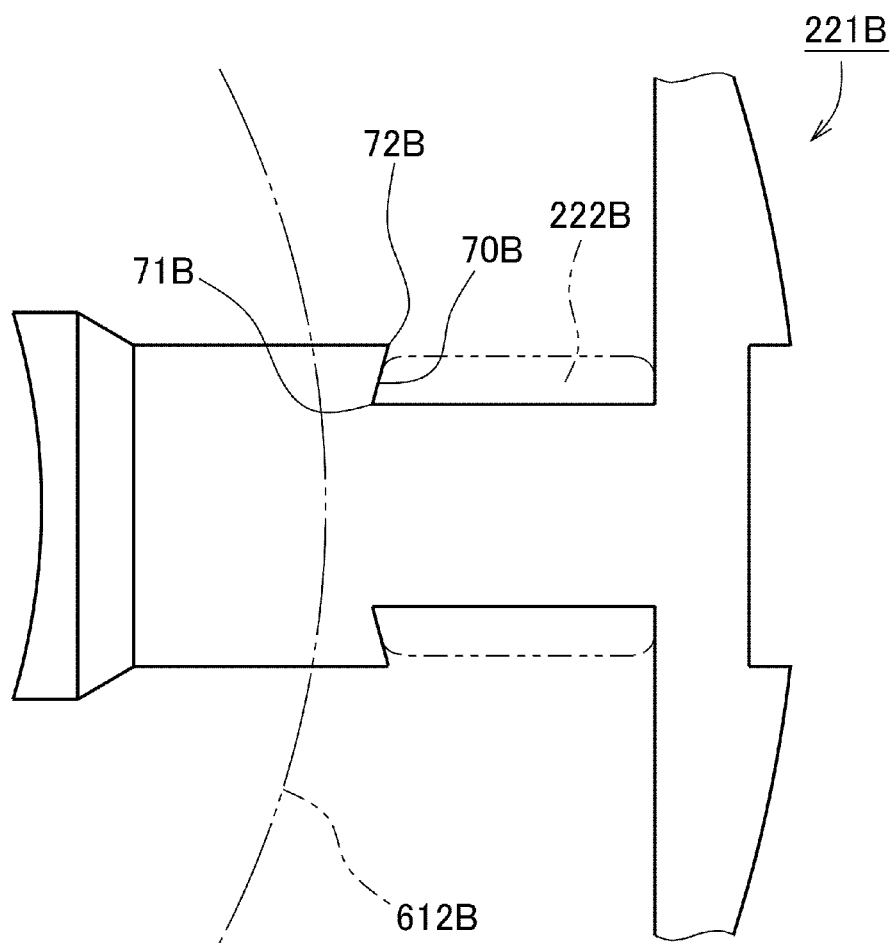
FIG. 7 is a partial top view of the stator core according to a preferred embodiment of the present invention.

FIG. 7 is a partial top view of a stator core 221B in one modified preferred embodiment of the present invention. In the example shown in FIG. 7, a side end portion 72B of a stepped surface 70B is positioned radially outward from a base end portion 71B of the stepped surface 70B. With such an arrangement, in the vicinity of a radially inner end portion of a coil 222B, the collapse of coil of a conducting wire is further prevented. Accordingly, the contact between the conducting wiring and an outer circumference 612B of the hub can be significantly reduced and prevented.

Figure 8:
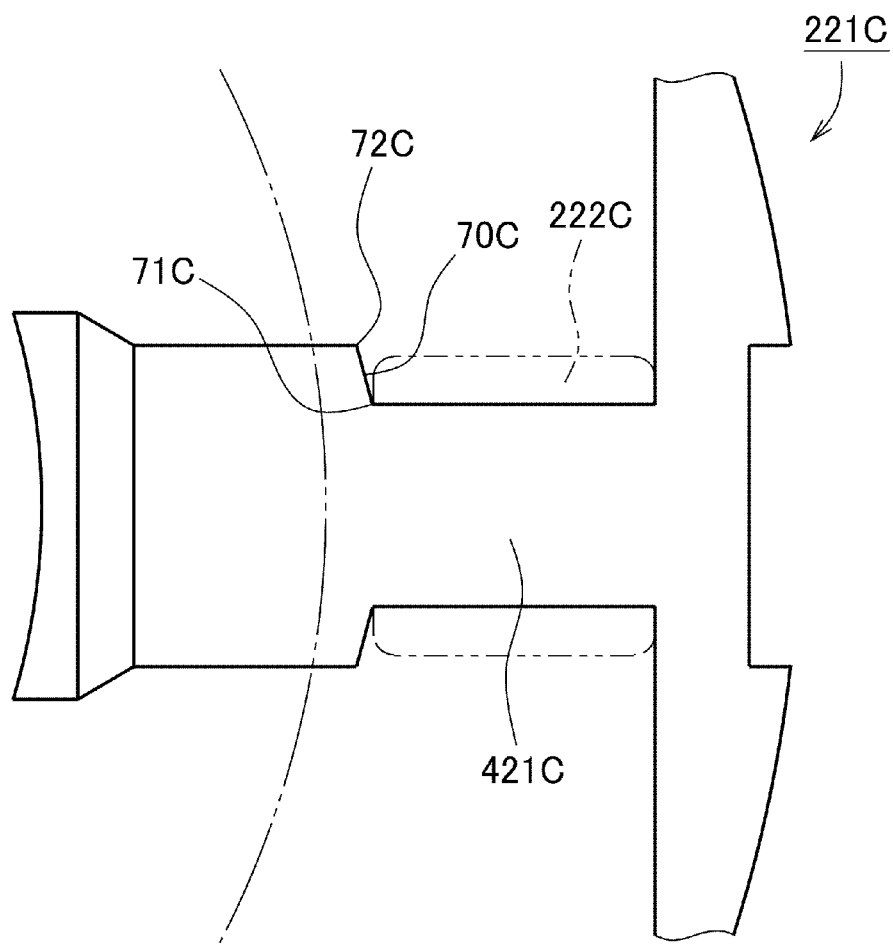
FIG. 8 is a partial top view of the stator core according to a preferred embodiment of the present invention.

FIG. 8 is a partial top view of a stator core 221C in another modified preferred embodiment of the present invention. In the example shown in FIG. 8, a side end portion 72C of a stepped surface 70C is positioned radially inward from a base end portion 71C of the stepped surface 70C. With such an arrangement, the conducting wire can be easily provided in the vicinity of the radially inner end portion of an outer core portion 421C. Accordingly, the working operation of providing a coil 222C by winding a conducting wire around the outer core portion 421C can be easily performed.

Figure 9:
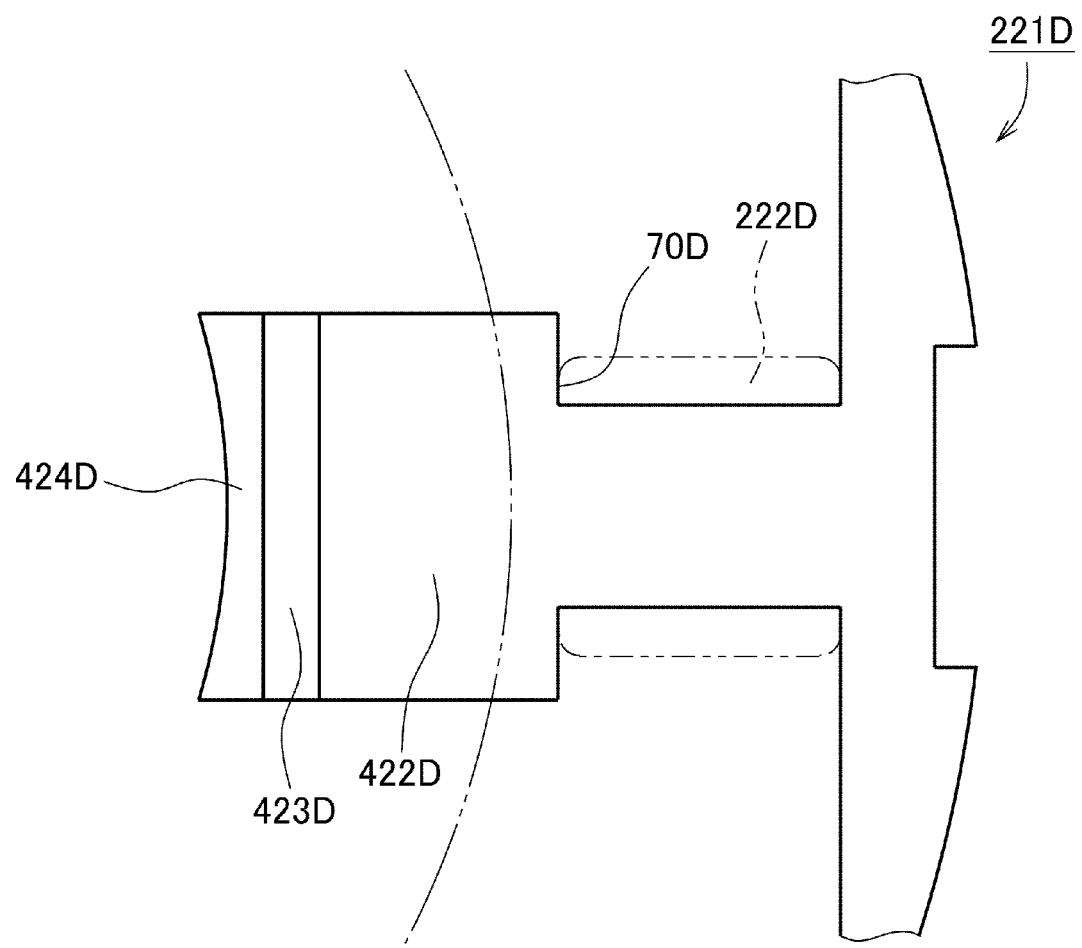
FIG. 9 is a partial top view of the stator core according to a preferred embodiment of the present invention.

FIG. 9 is a partial top view of a stator core 221D in another modified preferred embodiment of the present invention. In the example shown in FIG. 9, the width of a middle core portion 422D in the circumferential direction, the width of an inclined core portion 423D in the circumferential direction, and the width of an end core portion 424D in the circumferential direction are preferably equal or substantially equal to each other. In this way, a stepped surface 70D can be expanded in the circumferential direction. Accordingly, the collapse of a coil 222D can be even more significantly reduced and prevented.

As shown in FIG. 6, FIG. 7, and FIG. 8, if the width of the middle core portion in the circumferential direction is made smaller than the width of the end core portion in the circumferential direction, the area in which the upper surface of the middle core portion is opposite to the lower surface of an annular rest portion of the hub can be significantly reduced. As a result, the leakage of magnetic flux from the middle core portion to the annular rest portion can be significantly reduced. Especially in the case where the hub is provided by a magnetic body, the leakage of magnetic flux from the middle core portion to the annular rest portion may easily occur. For this reason, the arrangements shown in FIG. 6, FIG. 7, and FIG. 8 are preferred.

Figure 10:
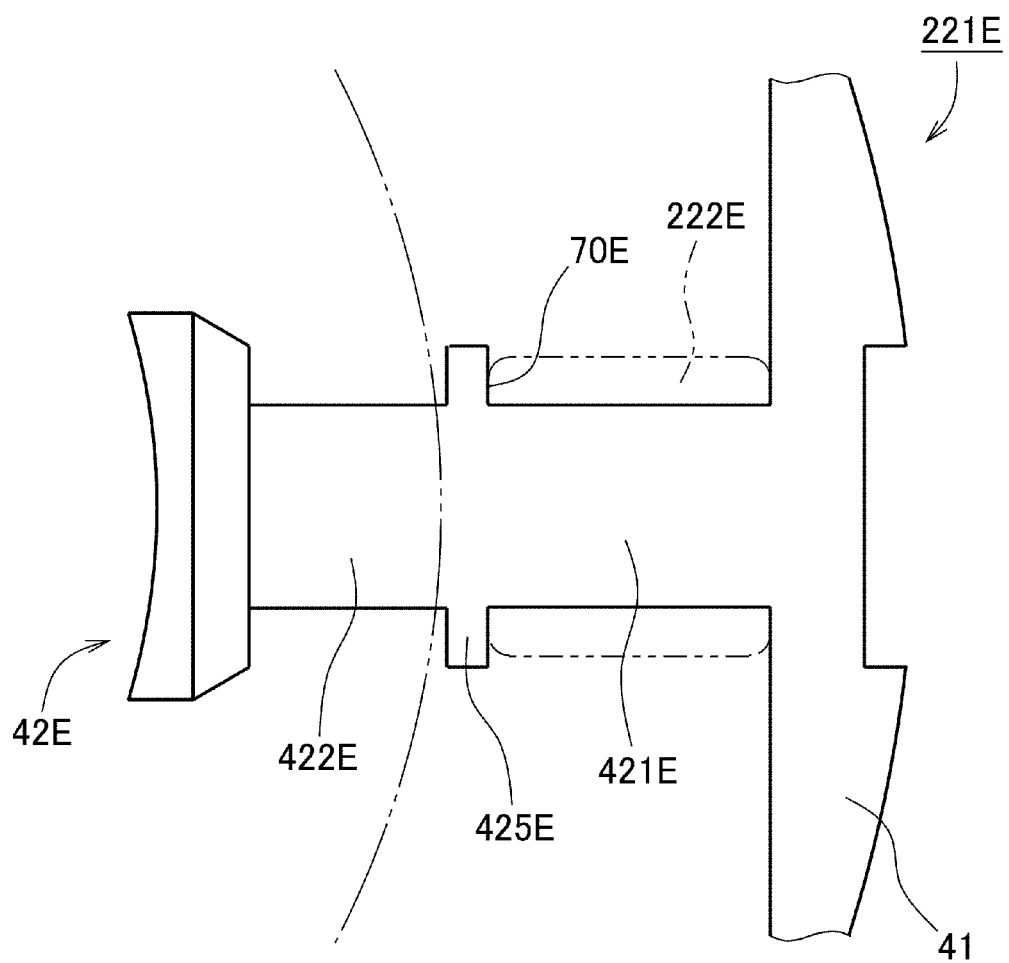
FIG. 10 is a partial top view of the stator core according to a preferred embodiment of the present invention.

FIG. 10 is a partial top view of a stator core 221E in another modified preferred embodiment of the present invention. In the example shown in FIG. 10, a wall portion 425E is provided between an outer core portion 421E and a middle core portion 422E. The width of the wall portion 425E in the circumferential direction is larger than the width of the outer core portion 421E in the circumferential direction and the width of the middle core portion 422E in the circumferential direction. In addition, the collapse of a coil 222E can be prevented by a stepped surface 70E on the radially outer side of the wall portion 425E.

With such a configuration, the width of the middle core portion 422E in the circumferential direction can be further reduced as compared with the above-described preferred embodiment and the respective modified preferred embodiments. If at least a portion of the middle core portion 422E is arranged so as to overlap the disk supporting portion of the hub in the plan view, the area in which the upper surface of the teeth 42E is opposite to the lower surface of the disk supporting portion can be even more significantly reduced. Accordingly, the leakage of magnetic flux from the teeth 42E to the annular rest portion can be even more significantly reduced.

It should be noted that if the width of the middle core portion 422E in the circumferential direction is smaller than the width of the outer core portion 421E in the circumferential direction, magnetic saturation may easily occur in the middle core portion 422E. Accordingly, in order to efficiently generate the magnetic flux in the radially inner end portion of the teeth 42E, it is preferred that the width of the middle core portion 42E in the circumferential direction is equal to or larger than the width of the outer core portion 421 in the circumferential direction.

It should be noted that the detailed shapes of the respective members may be different from those shown in the respective figures of the present application.

Various preferred embodiments of the present invention can be applied to a spindle motor and a disk driving device, for example.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
    a stationary portion; and
    a rotating portion which is supported rotatably with respect to the stationary portion and centered on a center axis extending vertically; wherein
    the stationary portion includes:
        a base portion extending in a direction orthogonal or substantially orthogonal to the center axis extending vertically;
        a stator core arranged on a side of an upper surface of the base portion; and
        a coil attached to the stator core;
    the rotating portion includes:
        a magnet arranged on a radially inner side of the stator core; and
        a disk supporting portion including a first supporting surface which is in contact with a lower surface of a disk, the disk supporting portion being arranged radially outward of the magnet;
    the stator core includes:
        a ring-shaped core back; and
        a plurality of teeth protruding from the core back toward a radially inner side;
    the disk supporting portion is positioned radially outward from a radially inner end portion of the teeth and is positioned radially inward from the coil;
    the radially inner end portion of the teeth, the disk supporting portion, and the coil overlap each other in a radial direction; and
    all portions of the disk supporting portion which are in contact with the lower surface of the disk are arranged radially inward from the coil and radially outward from the radially inner end portion of the teeth.

2. A spindle motor according to claim 1, wherein a height of an upper end portion of the coil is higher than a lower surface of the disk supporting portion and lower than the first supporting surface.

3. A spindle motor according to claim 1, wherein a height of an upper end portion of a radially inner end surface of the teeth is higher than a lower surface of the disk supporting portion and lower than the first supporting surface.

4. A spindle motor according to claim 1, wherein the plurality of teeth include:
    an outer core portion on which a conducting wire defining the coil is wound;
    a middle core portion radially extending between the disk supporting portion and the base portion at a position radially inward from the outer core portion;
    an inclined core portion extending radially inwards and upwards from an inner circumferential portion of the middle core portion; and
    an end core portion extending radially inwards from an inner circumferential portion of the inclined core portion; and
    a radially inner end surface of the end core portion is radially opposite to an outer circumference of the magnet.

5. A spindle motor according to claim 4, wherein the outer core portion and the middle core portion are radially continuous in the same position in the axial direction, and a lower end portion of the coil is positioned below an upper surface of the base portion.

6. A spindle motor according to claim 4, wherein the disk supporting portion includes a second supporting surface which is in contact with an inner circumferential portion of a disk, and the inclined core portion is positioned radially inward from the second supporting surface.

7. A spindle motor according to claim 4, wherein the disk supporting portion includes an inclined lower surface expanding along an upper surface of the inclined core portion.

8. A spindle motor according to claim 4, wherein an axial space between a lower surface of the disk supporting portion and an upper surface of the middle core portion is smaller than a space between a radially inner end surface of the end core portion and an outer circumference of the magnet.

9. A spindle motor according to claim 4, wherein the outer core portion is positioned radially outward from the disk supporting portion;
    the middle core portion is positioned radially inward from the coil; and
    a width of the middle core portion in the circumferential direction is larger than a width of the outer core portion in the circumferential direction.

10. A spindle motor according to claim 1, wherein a magnetically shielding plate defined by a magnetic body is arranged above the coil, and an upper surface of the magnetic shielding plate is positioned below the first supporting surface.

11. A spindle motor according to claim 1, wherein the stator core includes a laminated steel member defined by a plurality of magnetic steel plates laminated on each other in the axial direction;
    the base portion is defined by a magnetic body; and
    an adhesive is provided between the stator core and the base portion.

12. A spindle motor according to claim 1, wherein the first supporting surface is positioned lower than an upper end portion of the magnet.

13. A spindle motor according to claim 1, wherein the stationary portion includes:
    a bearing portion arranged to rotatably support a shaft on the side of the rotating portion; and
    a flange portion protruding radially outwards around the bearing portion;

the rotating portion includes:

a retaining member positioned below the flange portion; and a substantially cylindrical annular holding portion arranged to hold the magnet and the retaining member; and the base portion includes an inner cylindrical portion fixed to an outer circumference of the bearing portion.

14. A disk drive apparatus comprising:

a spindle motor recited in claim 1;

an access unit which is arranged to perform at least one of reading and writing of information from and to a disk supported by the rotating portion of the spindle motor; and a cover; wherein the rotating portion and the access unit are accommodated in the interior of a housing defined by the base portion and the cover.

15. A spindle motor comprising:

a stationary portion; and a rotating portion which is supported rotatably with respect to the stationary portion and centered on a center axis extending vertically; wherein the stationary portion includes:

a base portion extending in a direction orthogonal or substantially orthogonal to the center axis extending vertically;

a stator core arranged on a side of an upper surface of the base portion; and a coil attached to the stator core;

the rotating portion includes:

a magnet arranged on a radially inner side of the stator core; and a disk supporting portion including a first supporting surface which is in contact with a lower surface of a disk, the disk supporting portion being arranged radially outward of the magnet;

the stator core includes:

a ring-shaped core back; and a plurality of teeth protruding from the core back toward a radially inner side;

the disk supporting portion is positioned radially outward from a radially inner end portion of the teeth and is positioned radially inward from the coil;

the radially inner end portion of the teeth, the disk supporting portion, and the coil overlap each other in a radial direction; and the first supporting surface is positioned lower than an upper end portion of the magnet.

* * * * *